United States Patent
Izadian et al.

(10) Patent No.: US 10,033,082 B1
(45) Date of Patent: Jul. 24, 2018

(54) PCB INTEGRATED WAVEGUIDE TERMINATIONS AND LOAD

(71) Applicant: Waymo LLC, Mountain View, CA (US)

(72) Inventors: Jamal Izadian, Mountain View, CA (US); Adam Brown, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 407 days.

(21) Appl. No.: 14/818,769

(22) Filed: Aug. 5, 2015

(51) Int. Cl.
*G01S 7/02* (2006.01)
*H01P 5/12* (2006.01)
*H01P 1/22* (2006.01)
*H01Q 21/00* (2006.01)
*H01Q 17/00* (2006.01)

(52) U.S. Cl.
CPC .............. *H01P 5/12* (2013.01); *G01S 7/02* (2013.01); *H01P 1/222* (2013.01); *H01Q 17/00* (2013.01); *H01Q 21/005* (2013.01); *H01Q 21/0037* (2013.01)

(58) Field of Classification Search
CPC .... H01P 5/12; H01P 1/22; H01P 1/222; H01P 1/24; H01P 1/26; H01P 1/264; G01S 7/02; H01Q 17/00; H01Q 21/0037; H01Q 21/005
See application file for complete search history.

(56) References Cited

U.S. PATENT DOCUMENTS

| | | | | |
|---|---|---|---|---|
| 4,870,375 A | * | 9/1989 | Krueger, Jr. | H01P 3/081 333/246 |
| 4,878,724 A | * | 11/1989 | Thaniyavarn | H01S 5/4025 372/33 |
| 4,901,040 A | * | 2/1990 | Ahlborn | H01P 5/107 333/246 |
| 5,162,803 A | * | 11/1992 | Chen | H01Q 3/22 342/372 |
| 5,210,541 A | * | 5/1993 | Hall | H01Q 21/0075 343/700 MS |
| 5,543,805 A | * | 8/1996 | Thaniyavarn | H01Q 3/2676 342/368 |
| 5,694,134 A | * | 12/1997 | Barnes | H01G 7/06 333/161 |
| 5,751,248 A | * | 5/1998 | Thaniyavarn | H01Q 3/2676 342/368 |

(Continued)

*Primary Examiner* — Peter M Bythrow
(74) *Attorney, Agent, or Firm* — McDonnell Boehnen Hulbert & Berghoff LLP

(57) ABSTRACT

The present application discloses embodiments that relate to a radar system. The embodiments may include a plurality of radiating waveguides each having a waveguide input. The embodiments also include an attenuation component, which can be located on a circuit board. The embodiments further include a beamforming network. The beamforming network includes a beamforming network input. The beamforming network also includes a plurality of beamforming network outputs, where each beamforming network output is coupled to one of the waveguide inputs. Additionally, the beamforming network includes an attenuation port, wherein the attenuation port is configured to couple the beamforming network to the attenuation component. The attenuation component dissipates received electromagnetic energy.

20 Claims, 12 Drawing Sheets

(56) References Cited

U.S. PATENT DOCUMENTS

| | | | | |
|---|---|---|---|---|
| 5,796,881 A * | 8/1998 | Manasson | H01Q 3/2676 | 385/14 |
| 5,923,289 A * | 7/1999 | Buer | H01Q 3/2605 | 342/368 |
| 6,563,398 B1 * | 5/2003 | Wu | H01Q 21/0037 | 333/137 |
| 6,794,950 B2 * | 9/2004 | du Toit | H01P 5/107 | 333/21 R |
| 6,831,602 B2 * | 12/2004 | McKinzie, III | H01Q 3/2682 | 333/161 |
| 6,842,631 B1 * | 1/2005 | Allen | H01P 5/12 | 342/368 |
| 6,861,996 B2 * | 3/2005 | Jeong | H01Q 1/523 | 29/600 |
| 6,995,725 B1 * | 2/2006 | Honda | H01Q 1/246 | 343/767 |
| 7,183,995 B2 * | 2/2007 | Pleva | G01S 7/032 | 342/374 |
| 7,202,832 B2 * | 4/2007 | Wang | H01Q 1/3275 | 343/711 |
| 7,312,763 B2 * | 12/2007 | Mohamadi | H01Q 3/2652 | 333/103 |
| 7,321,339 B2 * | 1/2008 | Mohamadi | H01P 1/184 | 343/700 MS |
| 7,456,787 B2 * | 11/2008 | Manasson | H01Q 21/22 | 342/357.57 |
| 7,554,504 B2 * | 6/2009 | Mohamadi | H01Q 3/34 | 343/776 |
| 8,737,838 B2 * | 5/2014 | Adlerstein | H01Q 21/0006 | 398/115 |
| 8,912,859 B2 | 12/2014 | Leiba et al. | | |
| 8,976,072 B2 * | 3/2015 | Lenormand | H01Q 1/3275 | 343/762 |
| 9,013,359 B2 * | 4/2015 | Lenormand | H01Q 21/0043 | 343/771 |
| 9,612,317 B2 * | 4/2017 | Izadian | H01Q 3/40 | |
| 2002/0163478 A1 * | 11/2002 | Pleva | B60K 31/0008 | 343/853 |
| 2005/0128028 A1 * | 6/2005 | Sanchez | H01P 1/2005 | 333/157 |
| 2007/0241962 A1 * | 10/2007 | Shinoda | G01S 7/032 | 342/361 |
| 2011/0175780 A1 * | 7/2011 | Gatti | H01Q 1/3275 | 343/766 |
| 2012/0062335 A1 * | 3/2012 | Sherrer | H01P 5/12 | 333/127 |
| 2013/0027240 A1 * | 1/2013 | Chowdhury | G01S 7/032 | 342/94 |
| 2016/0141754 A1 * | 5/2016 | Leyh | H01Q 3/247 | 342/372 |

* cited by examiner

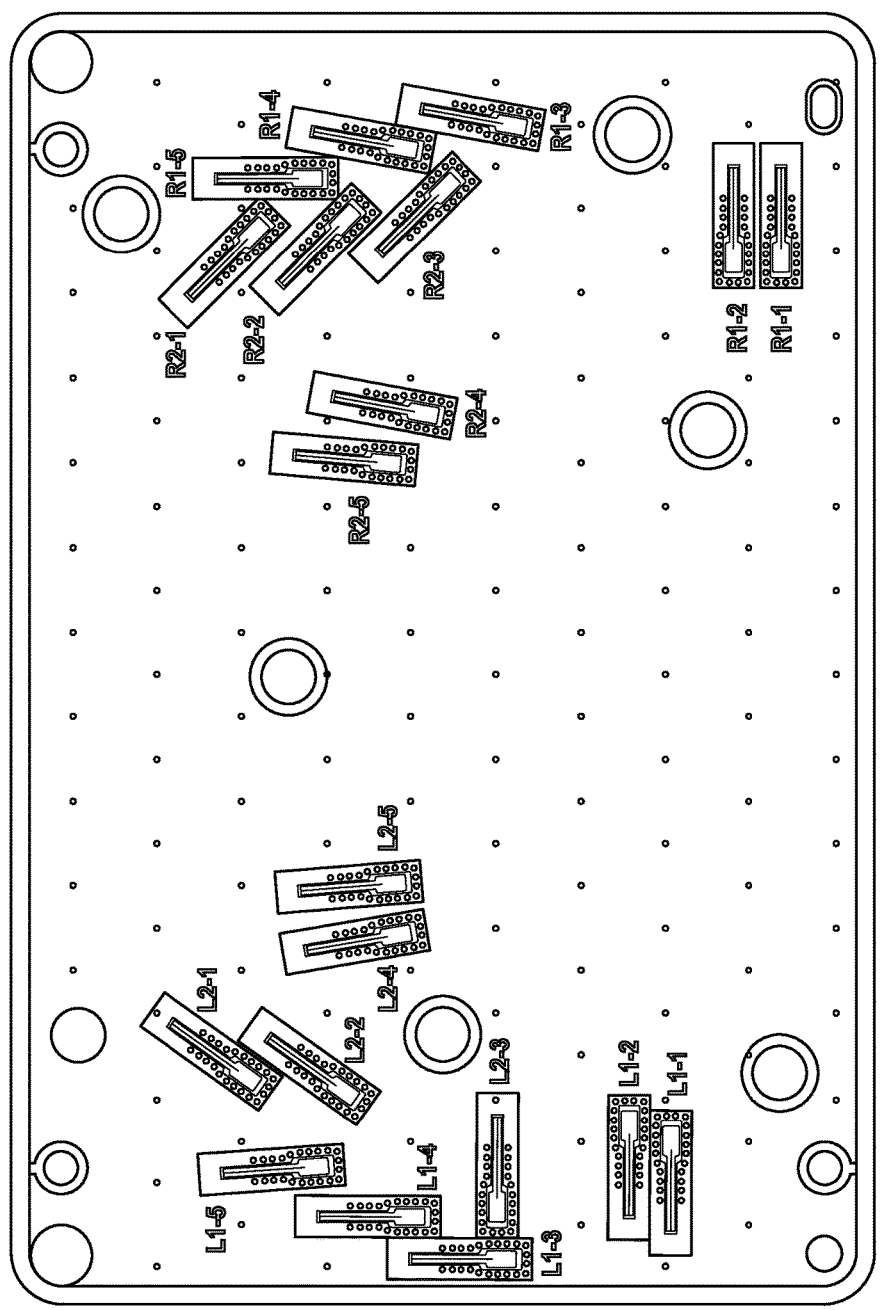

PCB INTEGRATED WAVEGUIDE TERMINATIONS AND LOAD

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals. Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to millimeter (mm) electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors; e.g., 1.3 inches high by 2.5 inches wide), efficient (i.e., there should be little 77 GHz energy lost to heat in the antenna, or reflected back into the transmitter electronics), and cheap and inexpensive to manufacture.

SUMMARY

The present application discloses embodiments that relate to a radar system. In one aspect, the present application describes an apparatus for use in a radar system. The apparatus may include a plurality of radiating waveguides each having a waveguide input. The radiating waveguides are aligned on a plane defined by a center of a width of the radiating waveguide and a length of the radiating waveguide, and each radiating waveguide comprises at least one radiating element. The apparatus also includes at least one attenuation component, where the at least one attenuation component is located on a circuit board. The apparatus further includes a beamforming network. The beamforming network is aligned on the plane defined by the center of the width of the radiating waveguide and the length of the radiating waveguide. The beamforming network includes a beamforming network input. The beamforming network also includes a plurality of beamforming network outputs, where each beamforming network output is coupled to one of the waveguide inputs. Additionally, the beamforming network includes at least one attenuation port, wherein the at least one attenuation port is configured to couple the beamforming network to the at least one attenuation component.

In another aspect, the present application describes a method. The method involves receiving electromagnetic energy by a waveguide. The waveguide is aligned on a plane defined by a center of a width of the waveguide and a length of the waveguide. The method also includes radiating at least a portion of the electromagnetic energy by radiating components of the waveguide. A portion of the electromagnetic energy that is not radiated is reflected as reflected electromagnetic energy. Further, the method includes coupling at least a portion of the reflected electromagnetic energy to an attenuation port. The attenuation port is aligned perpendicular to the plane. Additionally, the method includes coupling at least a portion of the reflected electromagnetic energy to an attenuation component, where the attenuation component is disposed on a circuit board. Yet further, the method includes dissipating the portion of the reflected electromagnetic energy coupled to the attenuation component by the attenuation component.

In yet another aspect, the present application describes an apparatus. The apparatus may include a waveguide feed configured to receive electromagnetic energy. The apparatus also includes a beamforming network coupled to the waveguide feed. The beamforming network is aligned on a plane defined by a center of a width of the beamforming network and a length of the beamforming network. The beamforming network has a plurality of elongated segments. And the beamforming network is configured to divide the electromagnetic energy into a plurality of portions of electromagnetic energy. The apparatus further includes a plurality of radiating waveguides located in the plane. Each radiating waveguide includes at least one radiating element. And each radiating waveguide receives one of the portions of electromagnetic energy. The radiating element is configured to radiate at least a portion of the received portion of electromagnetic energy. The radiating element may also reflect the portion of the received portion of electromagnetic energy that is not radiated. The apparatus also includes a respective attenuation port coupled to each of the elongated segments and configured to couple the reflected portion of the received portion of electromagnetic energy. Additionally, the apparatus includes a respective attenuation component coupled to each attenuation port and configured to attenuate the reflected portion of the received portion of electromagnetic energy, where the attenuation component is disposed on a circuit board.

In still another aspect, a system is provided that includes means for receiving electromagnetic energy by a waveguide. The waveguide is aligned on a plane defined by a center of a width of the waveguide and a length of the waveguide. The system also includes means for radiating at least a portion of the electromagnetic energy. A portion of the electromagnetic energy that is not radiated is reflected as reflected electromagnetic energy. Further, the system includes means for coupling at least a portion of the reflected electromagnetic energy to an attenuation port. The attenuation port is aligned perpendicular to the plane. Additionally, the system includes means for coupling at least a portion of the reflected electromagnetic energy to an attenuation component, where the attenuation component is disposed on a circuit board. Yet further, the system includes means for dissipating the portion of the reflected electromagnetic energy coupled to the attenuation component.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4C illustrates an example arrangement of waveguide terminations and loads on a circuit board, in accordance with an example embodiment.

DETAILED DESCRIPTION

Figure 1:
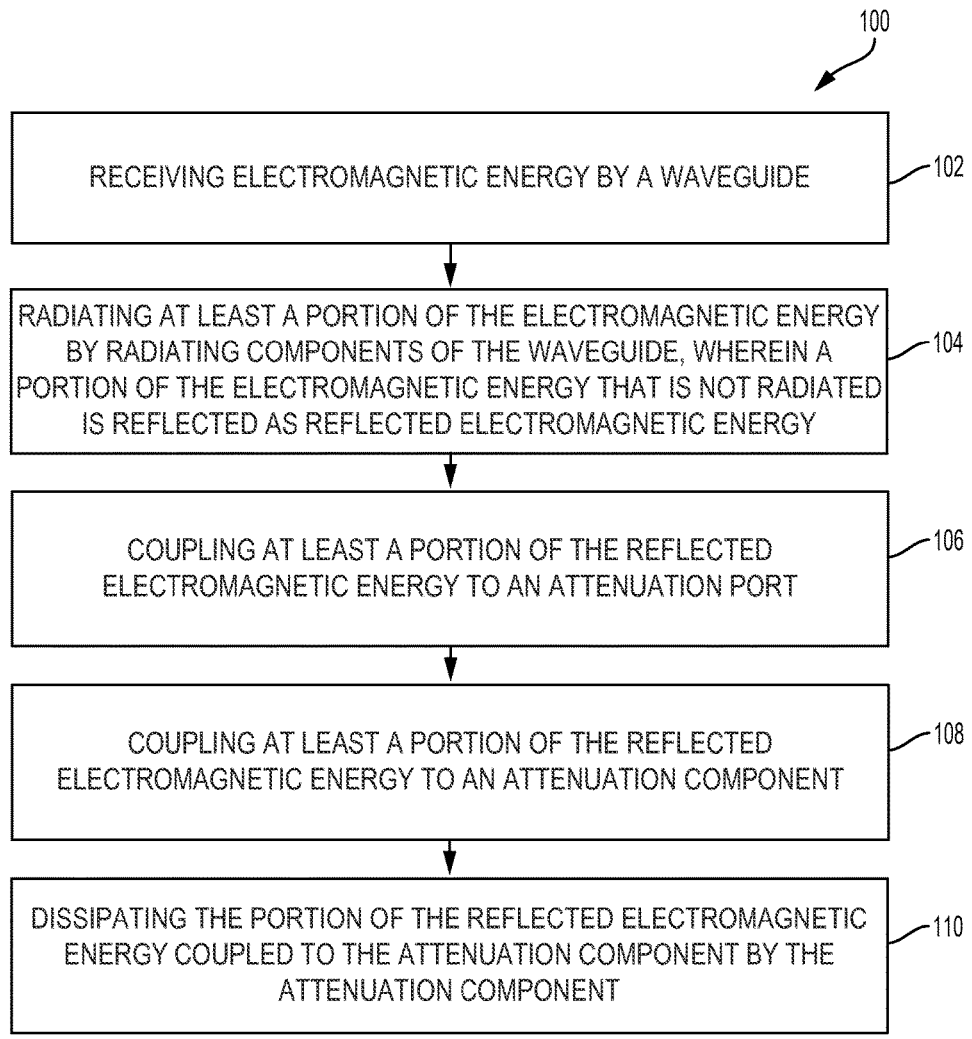
FIG. 1 is a flowchart of an example method to radiate electromagnetic energy.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description may disclose, inter alia, an apparatus including an antenna for a radar system for an autonomous vehicle, for instance, and a method for fabricating such an antenna. In some examples, the antenna may be a "dual open-ended waveguide" (DOEWG) antenna and the term "DOEWG" may refer herein to a short section of a horizontal waveguide channel plus a vertical channel that splits into two parts, where each of the two parts of the vertical channel includes an output port configured to radiate at least a portion of electromagnetic waves that enter the antenna.

An example DOEWG antenna may comprise, for example, two metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The DOEWG may also include at least a printed circuit board (PCB) backplane configured to absorb some electromagnetic radiation.

Further, the first metal layer may include a first half of the plurality of wave-radiating channels, where respective wave-radiating channels may be configured to receive the respective portions of electromagnetic waves from the wave-dividing channels, and where first halves of the respective wave-radiating channels include at least one wave-directing member configured to propagate sub-portions of electromagnetic waves to another metal layer.

Moreover, the second metal layer may include second halves of the input waveguide channel, the plurality of wave-dividing channels, and the plurality of wave-radiating channels. The second halves of the respective wave-radiating channels may include at least one pair of output ports partially aligned with the at least one wave-directing member and configured to radiate the sub-portions of electromagnetic waves propagated from the at least one wave-directing member out of the second metal layer. More particularly, a combination of a given wave-directing member with a corresponding pair of output ports may take the form of (and may be referred to herein as) a DOEWG, as described above.

While in this particular example the antenna includes multiple wave-dividing channels and multiple wave-radiating channels, in other examples the antenna may include, at a minimum, only a single channel configured to propagate all the electromagnetic waves received by the input port to one or more wave-radiating channels. For instance, all the electromagnetic waves may be radiated out of the second metal layer by a single DOEWG. Other examples are possible as well.

Furthermore, while in this particular example, as well as in other examples described herein, the antenna apparatus may be comprised of two metal layers, it should be understood that in still other examples, one or more of the channels described above may be formed into a single metal layer, or into more than two metal layers that make up the antenna. Still further, within examples herein, the concept of electromagnetic waves (or portions/sub-portions thereof) propagating from one layer of a DOEWG antenna to another layer is described for the purpose of illustrating functions of certain components of the antenna, such as the wave-directing members. In reality, electromagnetic waves may not be confined to any particular "half" of a channel during certain points of their propagation through the antenna. Rather, at these certain points, the electromagnetic waves may propagate freely through both halves of a given channel when the halves are combined to form the given channel.

In some embodiments discussed herein, the two metal layers may be joined directly, without the use of adhesives, dielectrics, or other materials, and without methods such as soldering, diffusion bonding, etc. that can be used to join two metal layers. For example, the two metal layers may be joined by making the two layers in physical contact without any further means of coupling the layers.

In some examples, the present disclosure is directed toward a printed circuit board (PCB) backplane configured to absorb some electromagnetic radiation. The previously-discussed radiating waveguides may be configured to receive an electromagnetic signal at the radiating waveguide input, propagate the electromagnetic signal down a length of the radiating waveguide, and coupled to at least a portion of the electromagnetic signal to at least one radiating element configured to radiate the coupled electromagnetic signal. However, a portion of the electromagnetic signal may not be radiated and may be either reflected or contained within the waveguide. This electromagnetic energy may produce undesired effects in the radar system. Therefore, to reduce the effects from electromagnetic energy that was not radiated, it may be desirable to absorb the non-radiated electromagnetic energy into a load. The waveguides may each be coupled to an attenuation port (or termination port) configured to absorb non-radiated electromagnetic energy that is present in the waveguide.

In one example, each of the beamforming network outputs may have a corresponding waveguide shunt, that is the end of the waveguide, located on the opposite end of the waveguide from the respective beamforming network output. Of the shunts, one may be coupled to the beamforming network input. The remaining shunts may each be coupled to a respective attenuation port (or termination port). In some examples, each shunt, including the shunt with the feed, may be coupled to an attenuation port. The attenuation port may be aligned perpendicular to the main length of the waveguide. Additionally, the attenuation port may include a geometry to impedance match the waveguide to the attenuation component. For example, the attenuation port may be a hole in a waveguide block coupling a circuit board layer to a waveguide layer.

The attention port may couple a waveguide of the beamforming network to an attenuation component located on the PCB. The attenuation component may include a metallic patch on the PCB. The metallic patch may function to couple the non-radiated electromagnetic energy out of the waveguide into the PCB. Once the non-radiated electromagnetic energy has coupled to the patch, various different means may be used to absorb the non-radiated electromagnetic energy. In one example, the patch may be coupled to other components that may dissipate the non-radiated electromagnetic energy. In one example, the patch may be coated with an electrically lossy material that will absorb electrical current present on the surface of the patch when it couples to the non-radiated electromagnetic energy. In another example, the PCB may have microstrip lines configured to absorb the non-radiated electromagnetic energy. The microstrip lines may absorb the non-radiated electromagnetic energy based on the lines being made from an electromagnetically lossy material, such as Nickel Chrome. In another example, the PCB may be constructed from an electromagnetically lossy material.

In one example, each attenuation port may function to absorb non-radiated electromagnetic energy itself. In a different example, each attenuation port may function to route the non-radiated electromagnetic energy to an attenuation component configured to absorb energy from more than one attenuation port.

Referring now to the figures, FIG. 1 is a flowchart of an example method 100 for the operation of a radar system. It should be understood that other methods of operation not described herein are possible as well.

It should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate at an electromagnetic wave frequency of 77 GHz, which corresponds to millimeter electromagnetic wave length. At this frequency, the channels, ports, etc. of an apparatus fabricated by way of method 100 may be of given dimensions appropriated for the 77 GHz frequency. Other example antennas and antenna applications are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Moreover, the method 100 of FIG. 1 may be implemented by the devices described in conjunction with FIGS. 2A-2F, 3A, 3B, and 4A-D.

At block 102, the method 100 includes receiving electromagnetic energy (e.g., 77 GHz millimeter electromagnetic waves) by a waveguide. The electromagnetic energy may be received from a waveguide feed coupled to the waveguide. In one example, receiving electromagnetic energy by a beamforming network input of the waveguide may be performed via a port in a bottom layer and coupling the electromagnetic energy from the port into the waveguide.

Additionally, the waveguide may be aligned on a plane defined by a center of a width of the waveguide and a length of the waveguide. For example, and as discussed with respect to the following figures, the waveguide may be constructed in a block. The waveguide and associated beamforming network may be created on a plane of the block. Further, the feed of the waveguide may be located perpendicular to the plane and couple energy from outside the waveguide into the waveguide.

At block 104, the method 100 includes radiating at least a portion of the electromagnetic energy by radiating components of the waveguide. The waveguide may have one or more radiating components. The radiating components may take the form of antennas, slots, or other radiating structures. During the transmission of signals, the radiating components are configured to convert guided electromagnetic energy from inside the waveguide to unguided electromagnetic energy radiated into free space, such that the electromagnetic energy is transmitted by the radiating components. Notably, a radiating component may not transmit all the electromagnetic energy that is exposed to the respective radiating component. Based on both an impedance and polarization match, the radiating component may only transmit a portion of the electromagnetic energy to which it is exposed. A portion of the electromagnetic energy that is not radiated is reflected back into the waveguide as reflected electromagnetic energy. The reflected electromagnetic energy is generally undesired; therefore, it may be desirable to remove it from the radar system by attenuation.

At block 106, the method 100 includes coupling at least a portion of the reflected electromagnetic energy to an attenuation port. The attenuation port is aligned perpendicular to the plane. Due to the perpendicular alignment of the attenuation port, the attenuation port removes at least a portion of the reflected electromagnetic energy from the plane of the waveguide.

In some examples, the radar system may include a plurality of attenuation ports. Each attenuation port may be coupled to an elongated segment of the waveguide. Further, each attenuation port may be shaped in a way to match (or approximately match) an impedance of the waveguide. By impedance matching, the amount of the reflected electromagnetic energy that is coupled from the waveguide to the attenuation port may be maximized.

At block 108, the method 100 includes coupling at least a portion of the reflected electromagnetic energy to an attenuation component. The attenuation component is configured to couple at least a portion of the reflected electromagnetic energy from the attenuation port. So when the attenuation component couples the at least a portion of the reflected electromagnetic energy, the attenuation component may essentially act as a receiving antenna.

In example embodiments, the attenuation component is disposed on a circuit board located outside of, or on an external surface of, the waveguide block structure. By having the attenuation component on a circuit board: (i) the attenuation component may be easy to manufacture, (ii) the at least a portion of the reflected electromagnetic energy may be removed from the waveguide block structure, and (iii) the circuit board may be used to attenuate the at least a portion of the reflected electromagnetic energy. In some examples, the attenuation component may include a patch on the surface of the circuit board. The patch may receive the at least a portion of the reflected electromagnetic energy from the attenuation port. In some examples, a surface of the patch may be configured to comprising absorb the portion of the reflected electromagnetic energy. In some further examples, the attenuation component may include at least one microstrip line on the circuit board. Yet further, the attenuation component may include conductive and/or resistive ink printed on the circuit board. The conductive and/or resistive ink may be applied to the PCB through a photo mask, photo imaging, or by other means. The conductive and/or resistive ink may be applied to gaps between the tips of differential pairs or to other gaps in lines on the PCB. Further, conductive and/or resistive ink may be applied to between a PCB line and a grounding element.

At block 110, the method 100 includes dissipating the portion of the reflected electromagnetic energy coupled to the attenuation component by the attenuation component. The attenuation component may be configured to act as a load or termination. When acting as a load or termination, the attenuation component may dissipate, that is reduce and/or get rid of, the reflected electromagnetic energy. The attenuation component may use various different ways to dissipate (or absorb) the reflected electromagnetic energy. In some examples, the attenuation component may be mounted on a lossy PCB. The lossy PCB will dissipate the reflected electromagnetic energy. In another example, a resistive surface of a patch (or other component) may cause dissipation of the reflected electromagnetic energy. In yet another example, the attenuation component may include a differential pair of lines configured to dissipate the reflected electromagnetic energy. The attenuation component may also be a single line, rather than a differential pair. In another example, the attenuation component may be made from Nickel Chrome (NiCr) as NiCr dissipates electromagnetic energy. In yet further examples, the attenuation component may be a resistive ink dot that dissipates electromagnetic energy. In other examples, the attenuation component may include microstrip and/or transmission lines on the PCB.

In some examples, the PCB may also be coupled to at least one heat sink. Because of the energy contained in the reflected electromagnetic energy, absorbing the energy may increase the temperature of the PCB. A heat sink may be able to dissipate heat from the PCB.

Figure 2A:
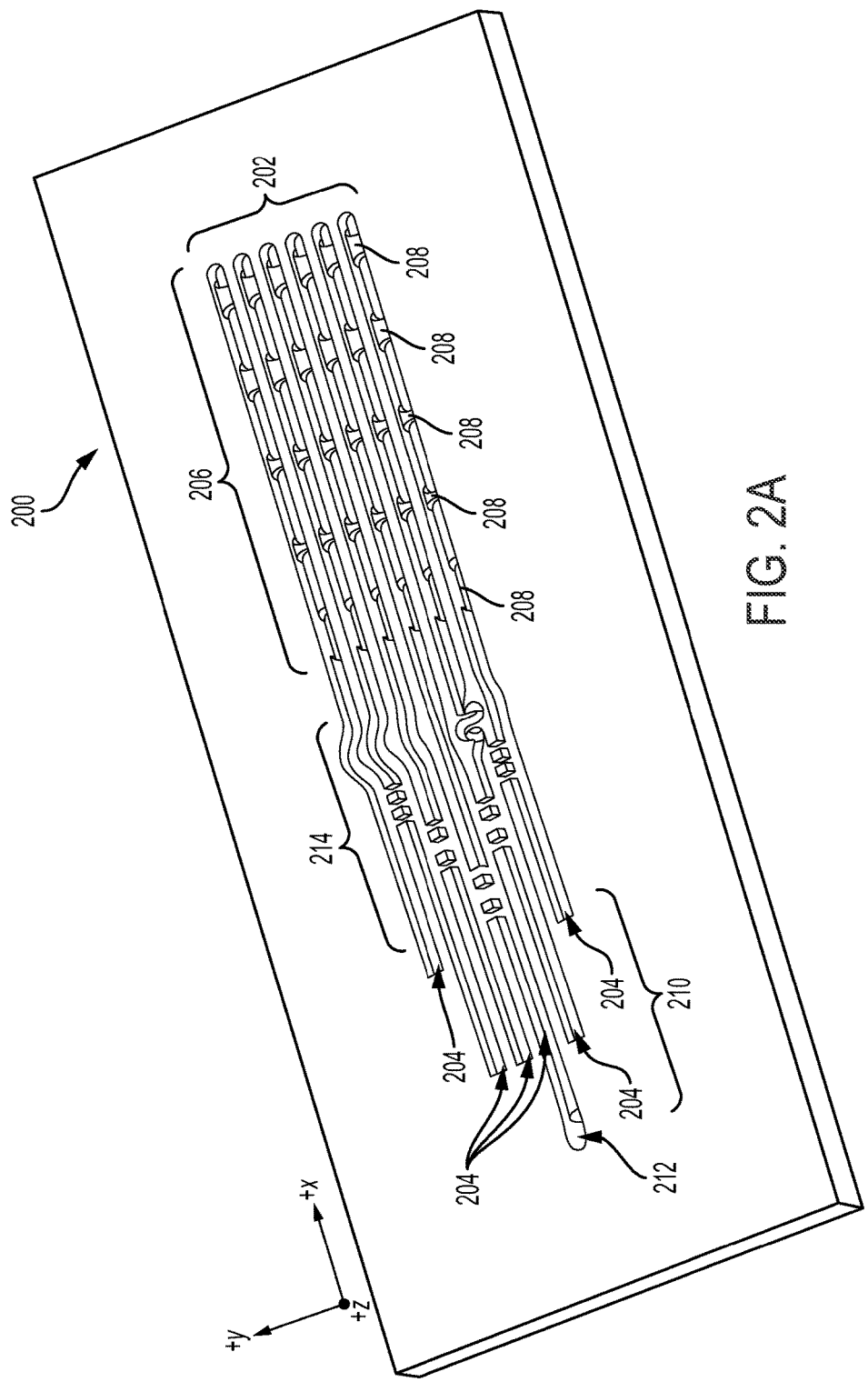
FIG. 2A illustrates a first layer of an example antenna, in accordance with an example embodiment.

FIG. 2A illustrates an example first metal layer 200 including a first half of a plurality of waveguide channels 202. These waveguide channels 202 may comprise multiple elongated segments 204. At a first end 206 of each elongated segment 204 may be a plurality of collinear wave-directing members 208, each with sizes similar or different from other wave-directing members. In line with the description above, the first ends 206 of the elongated segments 204 may be referred to herein as a first half of wave-radiating channels.

At a second end 210 of the channels 202 opposite the first end 206, one of the elongated segments 204 may include a through-hole 212 (i.e., input port). A given amount of power may be used to feed a corresponding amount of electromagnetic waves (i.e., energy) into the apparatus, and the through-hole 212 may be the location where these waves are fed into the apparatus. In line with the description above, the single channel/segment of the waveguide channels 202 that includes the input port may be referred to herein as an input waveguide channel. Further, the second end 210 of the channels 202 may be coupled to attenuation components (not shown here), as discussed throughout this disclosure.

Upon entering the apparatus, the electromagnetic waves may generally travel in the +x direction, as shown, towards an array of power dividers 214 (i.e., a "beam-forming network"). The array 214 may function to divide up the electromagnetic waves and propagate respective portions of the waves to respective first ends 206 of each elongated segment 204. More specifically, the waves may continue to propagate in the +x direction after leaving the array 214 toward the wave-directing members 208. In line with the description above, the array 214 section of the waveguide channels may be referred to herein as wave-dividing channels.

As the portions of the electromagnetic waves reach the wave-directing members 208 at the first end 206 of each elongated segment 204 of the waveguide channels 202, the wave-directing members 208 may propagate through respective sub-portions of the electromagnetic energy to a second half of the waveguide channels (i.e., in the +z direction, as shown). For instance, the electromagnetic energy may first reach a wave-directing member that is recessed, or machined further into the first metal layer 200 (i.e., a pocket). That recessed member may be configured to propagate a smaller fraction of the electromagnetic energy than each of the subsequent members further down the first end 206, which may be protruding members rather than recessed members. Further, each subsequent member may be configured to propagate a greater fraction of the electromagnetic waves travelling down that particular elongated segment 204 at the first end 206 than the member that came before it. As such, the member at the far end of the first end 206 may be configured to propagate the highest fraction of electromagnetic waves. Each wave-directing member 208 may take various shapes with various dimensions. In other examples, more than one member (or no members) may be recessed. Still other examples are possible as well. In addition, varying quantities of elongated segments are possible.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

Figure 2B:
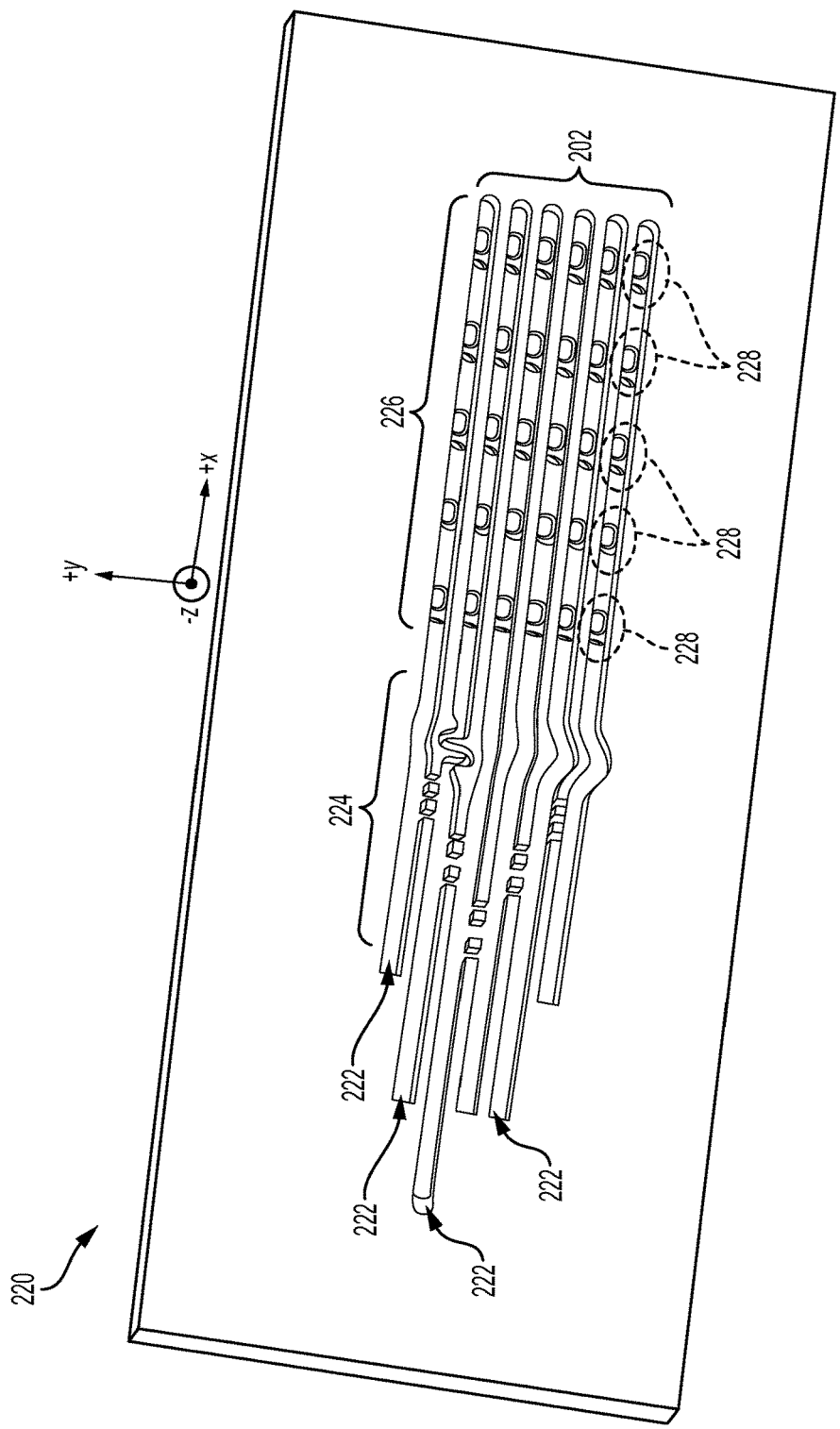
FIG. 2B illustrates a second layer of an example antenna, in accordance with an example embodiment.

FIG. 2B illustrates the second metal layer 220 described above. The second metal layer 220 may include a second half of the plurality of waveguide channels 202 of the first metal layer 200 shown in FIG. 2A (i.e., a second half of the input waveguide channel, the wave-dividing channels, and the wave-radiating channels). As shown, the second half of the waveguide channels 202 may take on the general form of the first half of the channels, so as to facilitate proper alignment of the two halves of the channels. The elongated segments of the second half 222 may include second halves of the array of power dividers 224. As described above, electromagnetic waves may travel through the array 224, where they are divided into portions, and the portions then travel (i.e., in the +x direction, as shown) to respective ends 226 of the second halves of the elongated segments 222. Further, an end 226 of a given elongated segment may include multiple pairs of through-holes 228, which may be at least partially aligned with the wave-directing members 208 of the first metal layer 200. More specifically, each pair of through-holes may be at least partially aligned with a corresponding wave-directing member, also referred to as a reflecting element, such that when a given sub-portion of electromagnetic waves are propagated from the first metal layer 200 to the second metal layer 220, as described above, those sub-portions are then radiated out of the pair of through-holes (i.e., a pair of output ports) in the −z direction, as shown. Again, the combination of a given wave-directing member and a corresponding pair of output ports may form a DOEWG, as described above.

Moreover, a combination of all the DOEWGs may be referred to herein as a DOEWG array. In antenna theory, when an antenna has a larger radiating aperture (i.e., how much surface area of the antenna radiates, where the surface area includes the DOEWG array) that antenna may have higher gain (dB) and a narrower beam width. As such, in some embodiments, a higher-gain antenna may include more channels (i.e., elongated segments), with more DOEWGs per channel. While the example antenna illustrated in FIGS. 2A and 2B may be suitable for autonomous-vehicle purposes (e.g., six elongated segments, with five DOEWGs per segment), other embodiments may be possible as well, and such other embodiments may be designed/machined for various applications, including, but not limited to, automotive radar.

For instance, in such other embodiments, an antenna may include a minimum of a single DOEWG. With this arrangement, the output ports may radiate energy in all directions (i.e. low gain, wide beam width). Generally, an upper limit of segments/DOEWGs may be determined by a type of metal used for the first and second metal layers. For example, metal that has a high resistance may attenuate an electromagnetic wave as that wave travels down a waveguide channel. As such, when a larger, highly-resistive antenna is designed (e.g., more channels, more segments, more DOEWGs, etc.), energy that is injected into the antenna via the input port may be attenuated to an extent where not much energy is radiated out of the antenna. Therefore, in order to design a larger antenna, less resistive (and more conductive) metals may be used for the first and second metal layers. For instance, in embodiments described herein, at least one of the first and second metal layers may be aluminum. Further, in other embodiments, at least one of the first and second metal layers may be copper, silver, or another conductive material. Further, aluminum metal layers may be plated with copper, silver, or other low-resistance/high-conductivity materials to increase antenna performance. Other examples are possible as well.

The antenna may include at least one fastener configured to join the first metal layer to the second metal layer so as to align the first half of the one or more waveguide channels with the second half of the one or more waveguide channels to form the one or more waveguide channels (i.e., align the first half of the plurality of wave-dividing channels with the second half of the plurality of wave-dividing channels, and align the first half of the plurality of wave-radiating channels with the second half of the plurality of wave-radiating channels). To facilitate this in some embodiments, the first metal layer, a first plurality of through-holes (not shown in FIG. 2A) may be configured to house the at least one fastener. Additionally, in the second metal layer, a second plurality of through-holes (not shown in FIG. 2B) may be substantially aligned with the first plurality of through-holes and configured to house the at least one fastener for joining the second metal layer to the first metal layer. In such embodiments, the at least one fastener may be provided into the aligned first and second pluralities of through-holes and secured in a manner such that the two metal layers are joined together.

In some examples, the at least one fastener may be multiple fasteners. Mechanical fasteners (and technology used to facilitate fastening) such as screws and alignment pins may be used to join the two metal layers together. Further, in some examples, the two metal layers may be joined directly to each other, with no adhesive layer in between. Still further, the two metal layers may be joined together using methods different than adhesion, diffusion bonding, soldering, brazing, and the like. However, it is possible that, in other examples, such methods may be used in addition to or alternative to any methods for joining metal layers that are known or not yet known.

In some embodiments, one or more blind-holes may be formed into the first metal layer and/or into the second metal layer in addition to or alternative to the plurality of through-holes of the first and/or the second metal layer. In such embodiments, the one or more blind-holes may be used for fastening (e.g., housing screws or alignment pins) or may be used for other purposes.

Figure 2C:
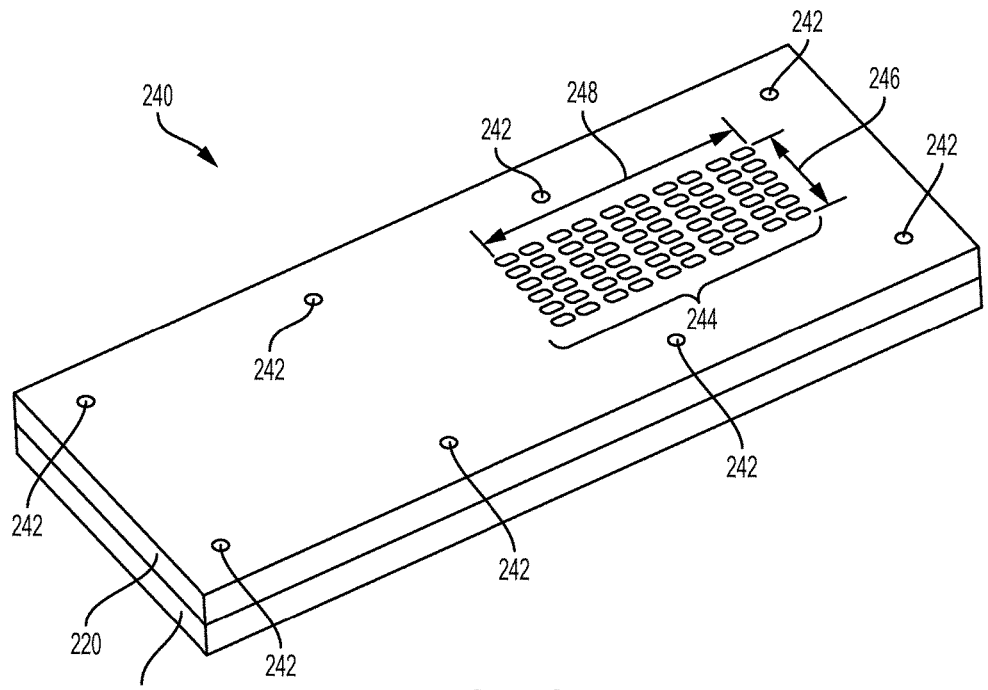
FIG. 2C illustrates an assembled view of an example antenna, in accordance with an example embodiment

FIG. 2C illustrates an assembled view of an example antenna 240. The example antenna 240 may include the first metal layer 200 and the second metal layer 220. The second metal layer 220 may include a plurality of holes 242 (through-holes and/or blind-holes) configured to house alignment pins, screws, and the like. The first metal layer 200 may include a plurality of holes as well (not shown) that are aligned with the holes 242 of the second metal layer 220.

Further, FIG. 2C illustrates a DOEWG array 244 of a given width 246 and a given length 248, which may vary based on the number of DOEWGs and channels of the antenna 240. For instance, in an example embodiment, the DOEWG array may have a width of about 11.43 mm and a length of about 28.24 mm. Further, in such an example embodiment, these dimensions, in addition to or alternative to other dimensions of the example antenna 240, may be machined with no less than about a 0.51 mm error, though in other embodiments, more or less of an error may be required. Other dimensions of the DOEWG array are possible as well. Further, in some examples, other shaped outputs may be used for the radiating elements. Although shown as ovals in FIG. 2C, the radiating elements can take any shape and the shape is not critical to the present disclosure. In some examples, the radiating elements may be square, circular, linear, z-shaped, etc.

In some embodiments, the first and second metal layers 200, 220 may be machined from aluminum plates (e.g., about 6.35 mm stock). In such embodiments, the first metal layer 200 may be at least 3 mm in thickness (e.g., about 5.84 mm to 6.86 mm). Further, the second metal layer 220 may be machined from a 6.35 mm stock to a thickness of about 3.886 mm. Other thicknesses are possible as well.

In some embodiments, the joining of the two metal layers 200, 220 may result in an air gap or other discontinuity between mating surfaces of the two layers. In such embodiments, this gap or continuity should be proximate to (or perhaps as close as possible to) a center of the length of the antenna apparatus and may have a size of about 0.05 mm or smaller.

Figure 2D:
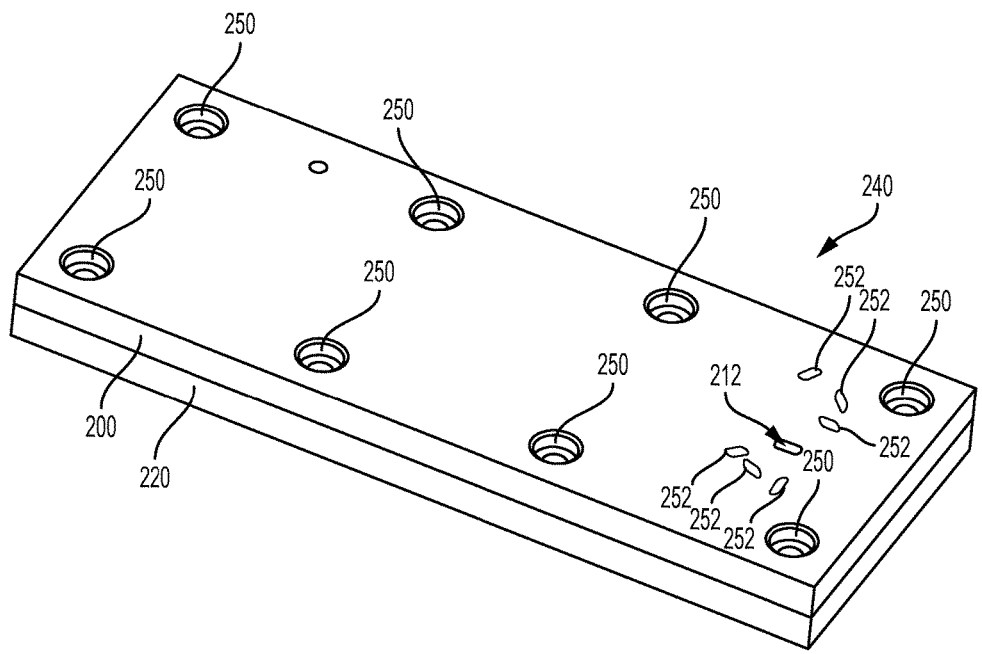
FIG. 2D illustrates an assembled view of an example antenna, in accordance with an example embodiment.

FIG. 2D illustrates another assembled view of the example antenna 240. As shown, the first metal layer 200 may include a plurality of holes 250 (through-holes and/or blind-holes) configured to house alignment pins, screws, and the like. One or more of the plurality of holes 250 may be aligned with the holes 242 of the second metal layer 220.

Further, FIG. 2D shows the input port 212, where the antenna 240 may receive electromagnetic waves into the one or more waveguide channels 202. In addition, FIG. 2D features multiple attenuation ports 252. The attenuation ports 252 may couple from waveguides within the first metal layer 200 to attenuation components on a PCB (not shown in FIG. 2D). The attenuation ports 252 may take the form of attenuation port 404 of FIG. 4A.

Figure 2E:
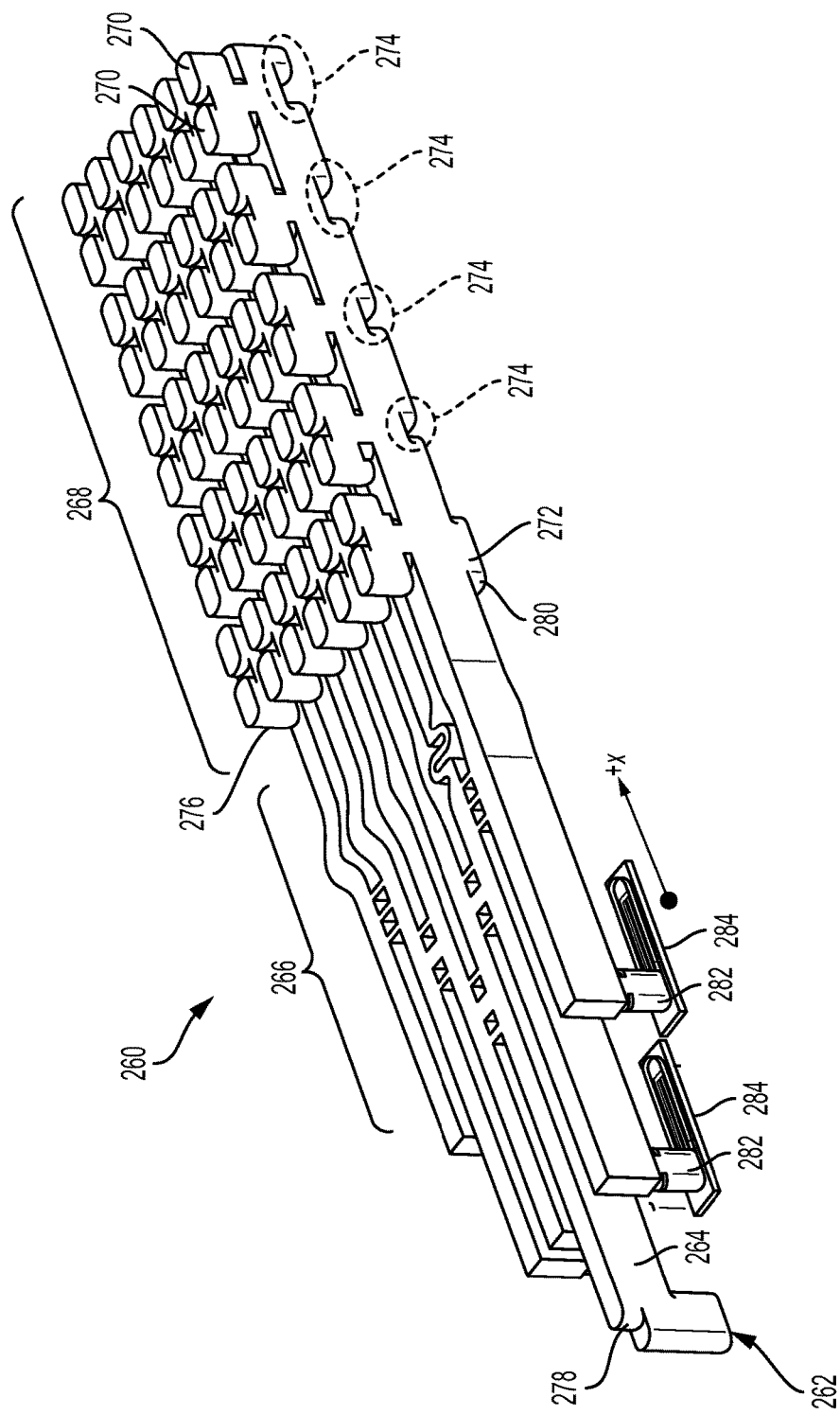
FIG. 2E illustrates conceptual waveguide channels formed inside an assembled example antenna, in accordance with an example embodiment.

FIG. 2E illustrates conceptual waveguide channels 260 formed inside an assembled example antenna. More particularly, the waveguide channels 260 take the form of the waveguide channels 202 of FIGS. 2A and 2B. For instance, the channels 260 include an input port 262 to the input waveguide channel 264. The channels 260 also include wave-dividing channels 266 and a plurality of radiating doublets 268 (i.e., a DOEWG array). As described above, when electromagnetic waves enter the channels 260 at the input port 262, they may travel in the +x direction through the input waveguide channel 264 and be divided into portions by the wave-dividing channels 266 (e.g., by the power dividers). Those portions of electromagnetic waves may then travel in the +x direction to respective radiating doublets 268, where sub-portions of those portions are radiated out each DOEWG through pairs of output ports, such as pair 270, for instance.

In a particular wave-radiating channel, a portion of electromagnetic waves may first be propagated through a first DOEWG with a recessed wave-directing member 272 (i.e., an inverse step, or "well"), as discussed above. This recessed wave-directing member 272 may be configured to radiate the smallest fraction of energy of all the members of the DOEWGs of the particular wave-radiating channel. In some examples, subsequent wave-directing members 274 may be formed (e.g., protruded, rather than recessed) such that each subsequent DOEWG can radiate a higher fraction of the remaining energy than the DOEWG that came before it. Phrased another way, each wave-directing member 272, 274 may generally be formed as a "step cut" into a horizontal (+x direction) channel (i.e., a wave-radiating channel, or the "first end" of an "elongated segment" as noted above) and used by the antenna to tune the amount of energy that is radiated vs. the amount of energy that is transmitted further down the antenna.

In some embodiments, a given DOEWG may not be able to radiate more than a threshold level of energy and may not be able to radiate less than a threshold level of energy. These thresholds may vary based on the dimensions of the DOEWG components (e.g., the wave-directing member, a horizontal channel, a vertical channel, a bridge between the two output ports, etc.), or may vary based on other factors associated with the antenna.

In some embodiments, the first and second metal layers may be machined such that various sides of the waveguide channels 260 have rounded edges, such as edge 276, 278, and 280, for example.

Further shown in FIG. 2E are both attenuation ports 282 and attenuation components 284. The attenuation components 284 may be coupled to the attenuation ports 282. And the attenuation ports 282 may be coupled to the elongated segments 222 of the wave-dividing channels 266. The design of the attenuation components 284 and attenuation ports 282 are discussed further with respect to FIG. 4B.

Figure 2F:
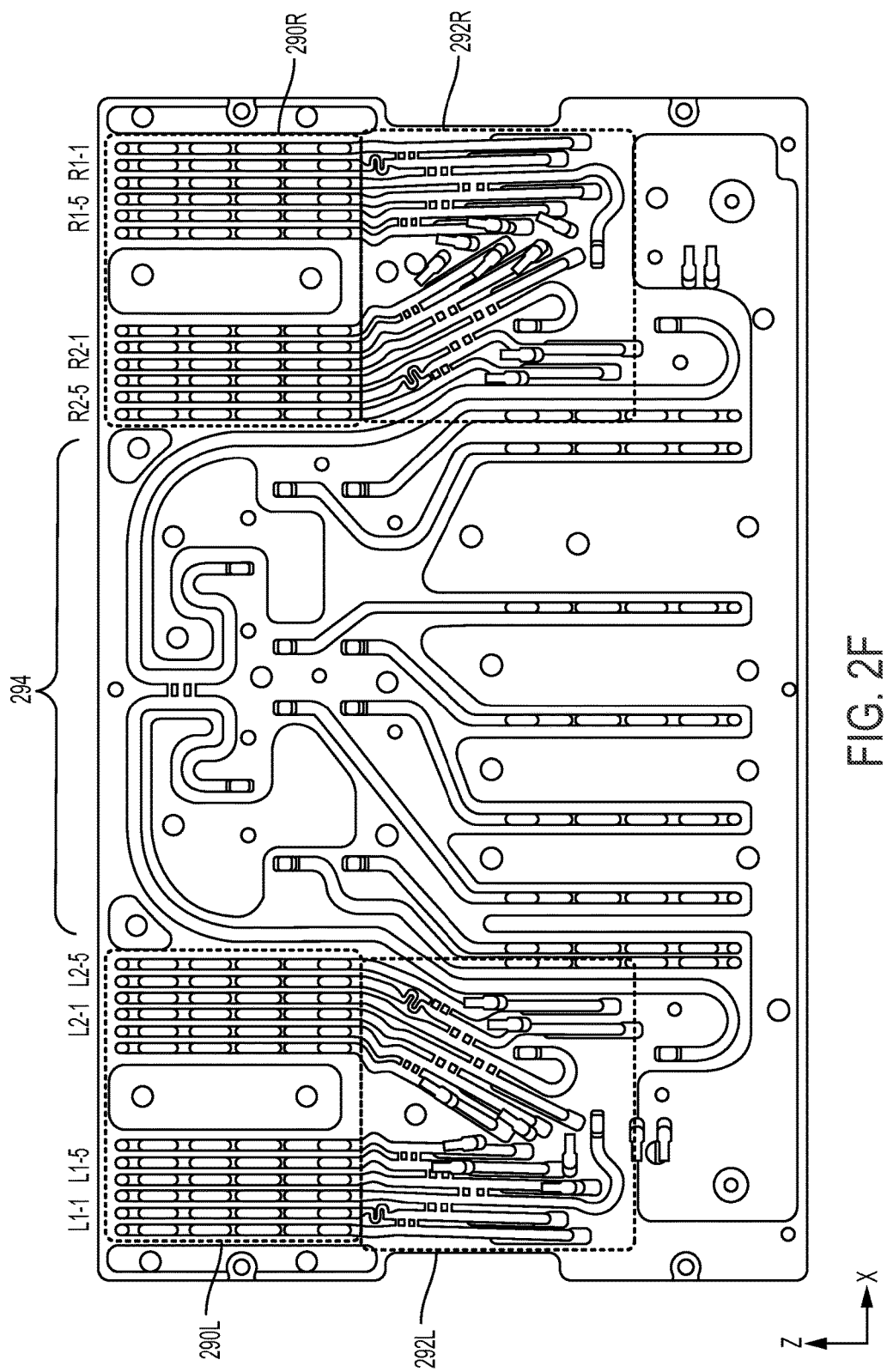
FIG. 2F illustrates four sets of transmitting waveguide channels formed inside an assembled example antenna.

FIG. 2F illustrates four sets of transmitting waveguide channels formed inside an assembled example antenna. FIG. 2F presents one example layout for a plurality of waveguides for use in an automotive radar system. The layout shown in FIG. 2F shows one example layout of the plurality of waveguides in a layer. As shown in FIG. 2F, there are four sets of waveguides configured to transmit electromagnetic radiation. Two sets on the left are labeled as L1-1 through L1-5 and L2-1 through L2-5 and the two sets on the right are labeled as R1-1 through R1-5 and R2-1 through R2-5. Each set of waveguides has a radiating region shown as 290L and 290R. Each set of waveguides has a beam forming section shown as 292L and 292R. The beamforming sections 292L and 292R may include sections of waveguides that are not in straight lines. The waveguides shown in FIG. 2F may be similar to those described with respect to the other figures of the present disclosure.

Yet further, also shown in FIG. 2F are eight receiving waveguides located in region 294. Although the present disclosure is generally related to coupling attenuation components and attenuation ports to radiating waveguides, each may also be coupled to receiving waveguides, such as those located in region 294.

Figure 3A:
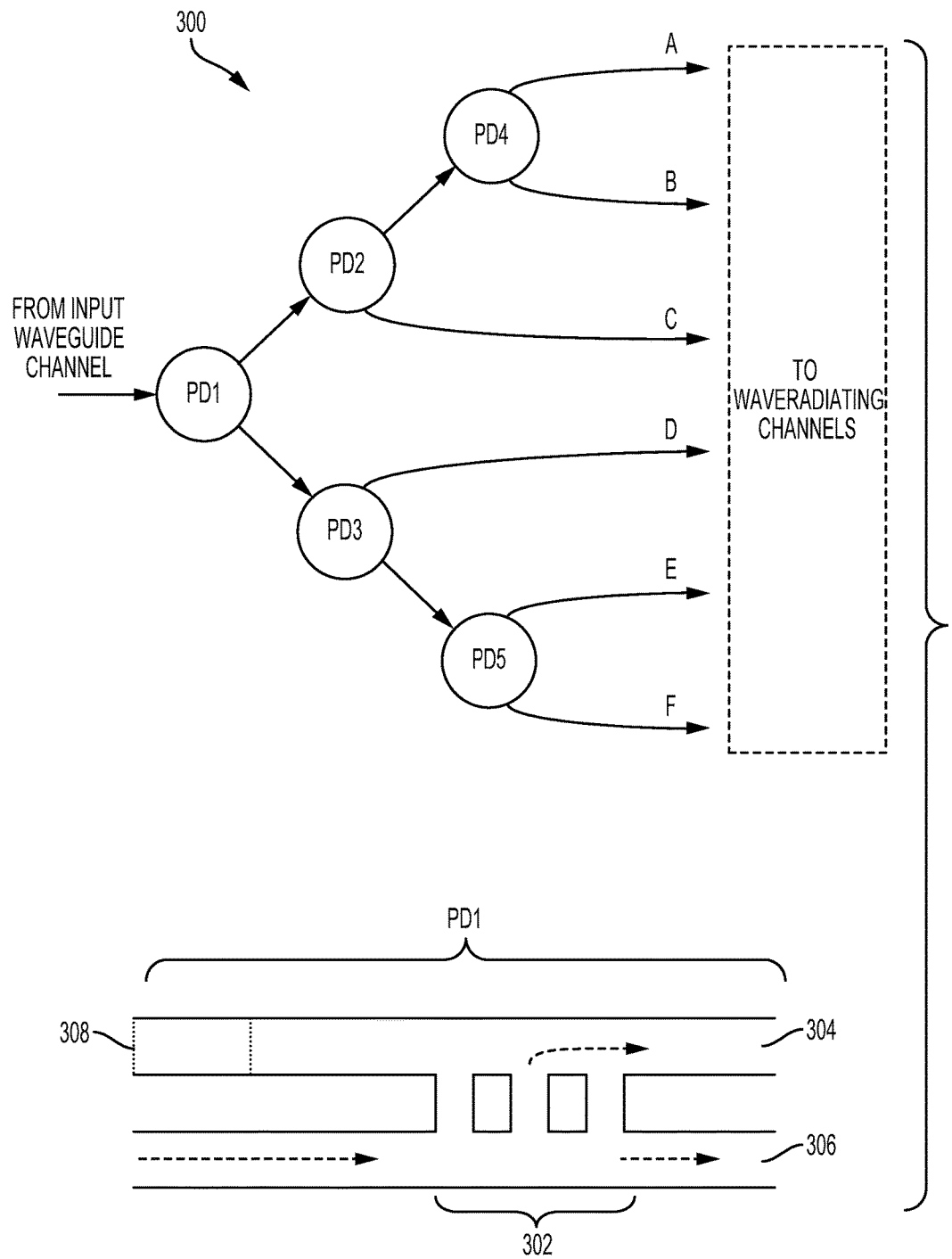
FIG. 3A illustrates a network of wave-dividing channels of an example antenna, in accordance with an example embodiment.
Figure 3B:
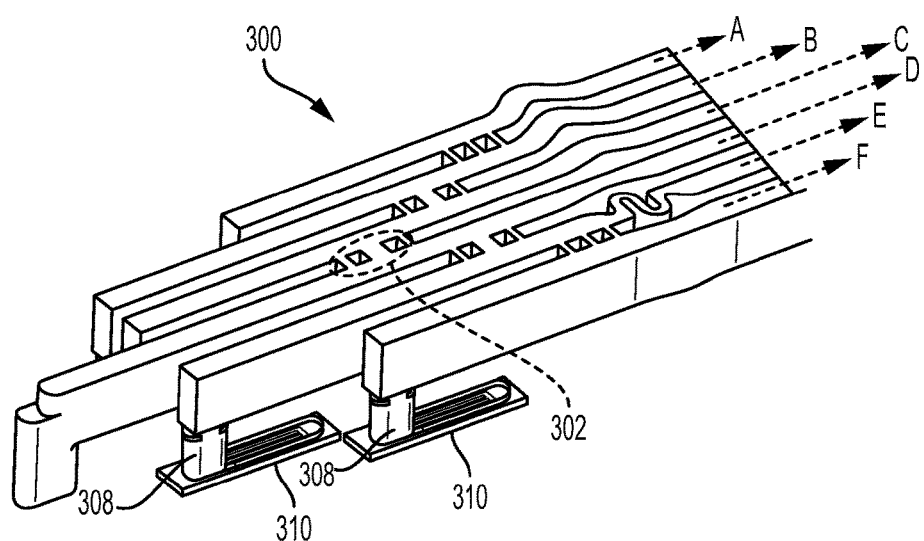
FIG. 3B illustrates an alternate view of the network of wave-dividing channels of FIG. 3A, in accordance with an example embodiment.

FIG. 3A illustrates a network of wave-dividing channels 300 of an example antenna, in accordance with an example embodiment. FIG. 3B illustrates an alternate view of the network of wave-dividing channels 300, in accordance with an example embodiment.

In some embodiments, the network (e.g., beam-forming network, as noted above) of wave-dividing channels 300 may take the form of a tree of power dividers, as shown in FIG. 3A. Energy may enter the antenna through the input waveguide channel and is divided (i.e., split) into smaller portions of energy at each power divider, such as power divider 302, and may be divided multiple times via subsequent power dividers so that a respective amount of energy is fed into each of the wave-radiating channels (energy A-F, as shown). The amount of energy that is divided at a given power divider may be controlled by a power division ratio (i.e., how much energy goes into one channel 304 versus how much energy goes into another channel 306 after the division). A given power division ratio may be adjusted based on the dimensions of the corresponding power divider. Further, each power divider and associated power division ratio may be designed/calculated in order to achieve a desired "power taper" at the wave-radiating channels. In such a case, the antenna may be designed with a "Taylor window" (e.g., radiation ripples drop off at edges) or other window such that sidelobes of the antenna's far-field radiation pattern may be low. As an example, the power division ratios of the power dividers may be set such that energy portions A, B, C, D, E, and F are approximately 3.2%, 15.1%, 31.7%, 31.7%, 15.1%, 3.2% of the energy, respectively. Other example power divisions are possible as well.

Within examples, a technique for dividing energy between two channels 304, 306 may be to use a structure of channels (i.e., a "four-port branchline coupler) such as that shown at the bottom of FIG. 3A. Such a technique and structure design may include attenuation components 310 and attenuation ports 308 at the end of a channel, as shown in FIGS. 3A and 3B, where each of the attenuation ports 308 is configured to couple energy that returns backwards through the channel to one of the attenuation components 310. The attenuation components 310 may be configured to absorb the returned energy. The design of the attenuation components 310 and attenuation ports 308 are discussed further with respect to FIG. 4B.

Figure 4A:
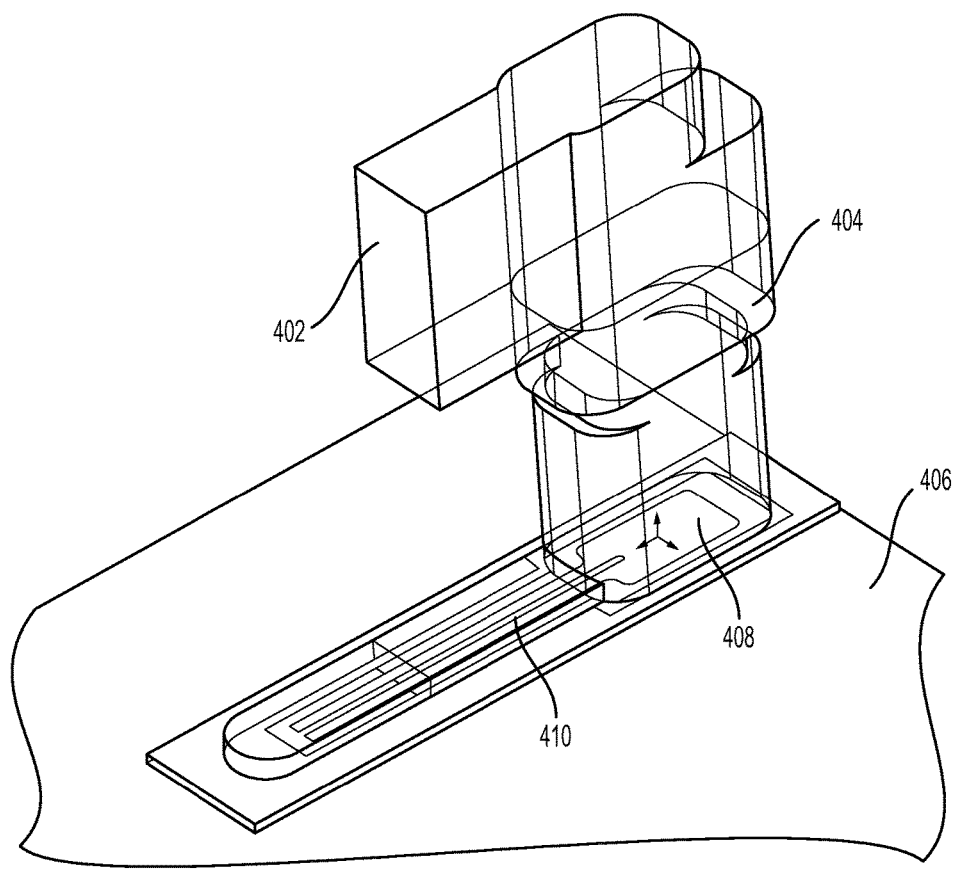
FIG. 4A illustrates an example waveguide termination including attenuation port, patch, and attenuation components, in accordance with an example embodiment.

FIG. 4A illustrates an example waveguide 402 termination comprising attenuation port 404, patch 408, and attenuation components 410. The patch 408, and attenuation components 410 may be mounted on a PCB 406. The PCB may be mounted to a bottom surface of an antenna like that shown in FIG. 2D.

The waveguide 402 of FIG. 4A may be a portion of a waveguide elongated segments, such as elongated segments 204 of FIG. 2A. More specifically, the waveguide 402 of FIG. 4A may be one of the elongated segments that does not include the feed. As previously discussed, during the operation of the antenna some electromagnetic energy that is not radiated by the radiation components may be reflected back into the waveguide. In order to remove the reflected electromagnetic energy, the waveguide 402 may be coupled to an attenuation port 404. The attenuation port 404 may be aligned perpendicularly, and out of the plane of the waveguide 402. The attenuation port 404 may be configured to couple the reflected electromagnetic energy to an attenuation component (shown here as patch 408 and lines 410) located on a PCB 406.

As shown in FIG. 4A, each attenuation port 404 may be shaped in a way to match (or approximately match) an impedance of the waveguide. By impedance matching, the amount of the reflected electromagnetic energy that is coupled from the waveguide 402 to the attenuation port 404 may be maximized. For example, the attenuation port 404 may have portions that are of different dimensions to achieve the correct impedance matching.

As previously discussed, the attenuation component is configured to couple at least a portion of the reflected electromagnetic energy from the attenuation port 404. So when the attenuation component couples the at least a portion of the reflected electromagnetic energy, the attenuation component may essentially act as a receiving antenna. The attenuation component receives the at least a portion of the reflected electromagnetic energy from the attenuation port.

The attenuation component is disposed on a circuit board 406 located outside of, or on an external surface of, the waveguide block structure. In some examples, the attenuation component may include a patch 408 on the surface of the circuit board. The patch 408 may receive the at least a portion of the reflected electromagnetic energy from the attenuation port. In some examples, a surface of the patch may be configured to comprising absorb the portion of the reflected electromagnetic energy. In some further examples, the attenuation component may include at least one microstrip line on the circuit board. Yet further, the attenuation component may include conductive ink printed on the circuit board.

The attenuation component may be configured to act as a load or termination. When acting as a load or termination, the attenuation component may dissipate, that is reduce and/or get rid of, the reflected electromagnetic energy. The attenuation component may use various different ways to dissipate (or absorb) the reflected electromagnetic energy. In some examples, the attenuation component may be mounted on a lossy PCB 406. The lossy PCB 406 will dissipate the reflected electromagnetic energy. In another example, a resistive surface of a patch (or other component) may cause dissipation of the reflected electromagnetic energy. In yet another example, the attenuation component may include a differential pair of lines 410 configured to dissipate the reflected electromagnetic energy. In other examples, the attenuation component may include a singled ended line configured to dissipate the reflected electromagnetic energy. In another example, the attenuation component may be made from Nickel Chrome (NiCr) as NiCr dissipates electromagnetic energy. In yet further examples, the attenuation component may be a resistive ink dot that dissipates electromagnetic energy. In other examples, the attenuation component may include microstrip and/or transmission lines on the PCB 406.

In some examples, the PCB 406 may also be coupled to at least one heat sink. Because of the energy contained in the reflected electromagnetic energy, absorbing the energy may increase the temperature of the PCB 406. A heat sink may be able to dissipate heat from the PCB 406.

Figure 4B:
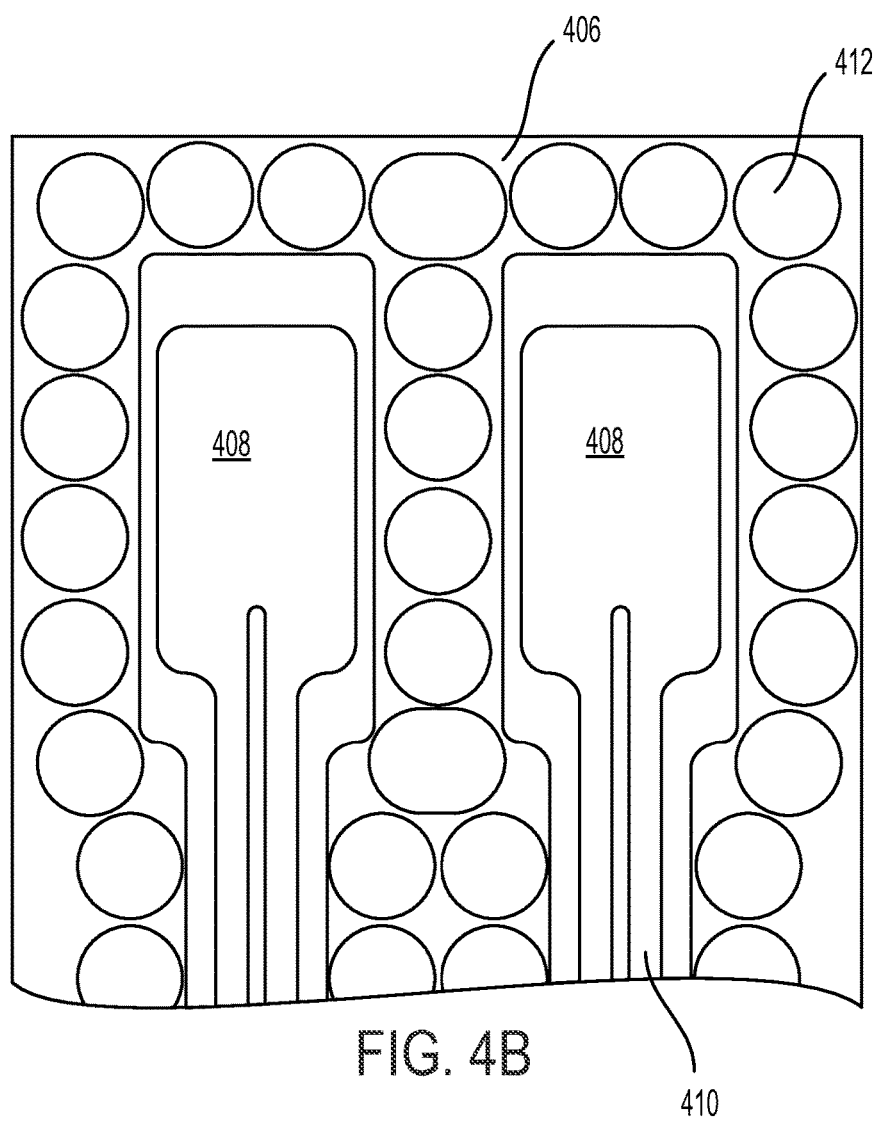
FIG. 4B illustrates an example top-down view of two patches mounted on a circuit board, in accordance with an example embodiment.

FIG. 4B shows a top-down view of two patches 408 mounted on a circuit board 406. The two patches 408 may each be coupled to a respective attenuation port 404. Thus, the two patches 408 may each receive a different reflected signal from the respective attenuation port 404 coupled to each of the two patches 408. Further, each patch 408 may be coupled to components further configured to dissipate the reflected electromagnetic energy. As shown in FIG. 4B, the patches 408 are coupled to differential pair lines 410. The differential pair lines 410 may be configured to dissipate the reflected electromagnetic energy. The patches may be, or coupled to components, made from conductive ink. The conductive ink may be resistive and dissipate the reflected electromagnetic energy. Further shown in FIG. 4B are grounding points 412. The grounding points 412 are points that may be used to introduce an electrical ground to the PCB 406. The grounding points 412 may form an electrical contact with the waveguide block, such as the bottom of waveguide block shown in FIG. 2D.

FIG. 4C illustrates an example arrangement of waveguide terminations and loads on a circuit board, in accordance with an example embodiment. The example PCB layout shown in FIG. 4C may be used with the example waveguide block layout shown in FIG. 2F. Each of the waveguides (other than the one being fed) of FIG. 2F may be coupled to a respective attenuating component in the PCB. The attenuating components of FIG. 4C may be similar to those described throughout this disclosure.

Waveguides L1-1 through L1-5 of FIG. 2F may be coupled to attenuating component L1-1 through L1-5 of FIG. 4C, respectively. Additionally, waveguides L2-1 through L2-5 of FIG. 2F may be coupled to attenuating component L2-1 through L2-5 of FIG. 4C, respectively. Further, waveguides R1-1 through R1-5 of FIG. 2F may be coupled to attenuating component R1-1 through R1-5 of FIG. 4C, respectively. Yet further, waveguides R2-1 through R2-5 of FIG. 2F may be coupled to attenuating component R2-1 through R2-5 of FIG. 4C, respectively. Thus, each waveguide may have an associated attenuating component for attenuating reflected signals. In some examples, both the fed and non-fed waveguides may each have an associated attenuating component.

Figure 4D:
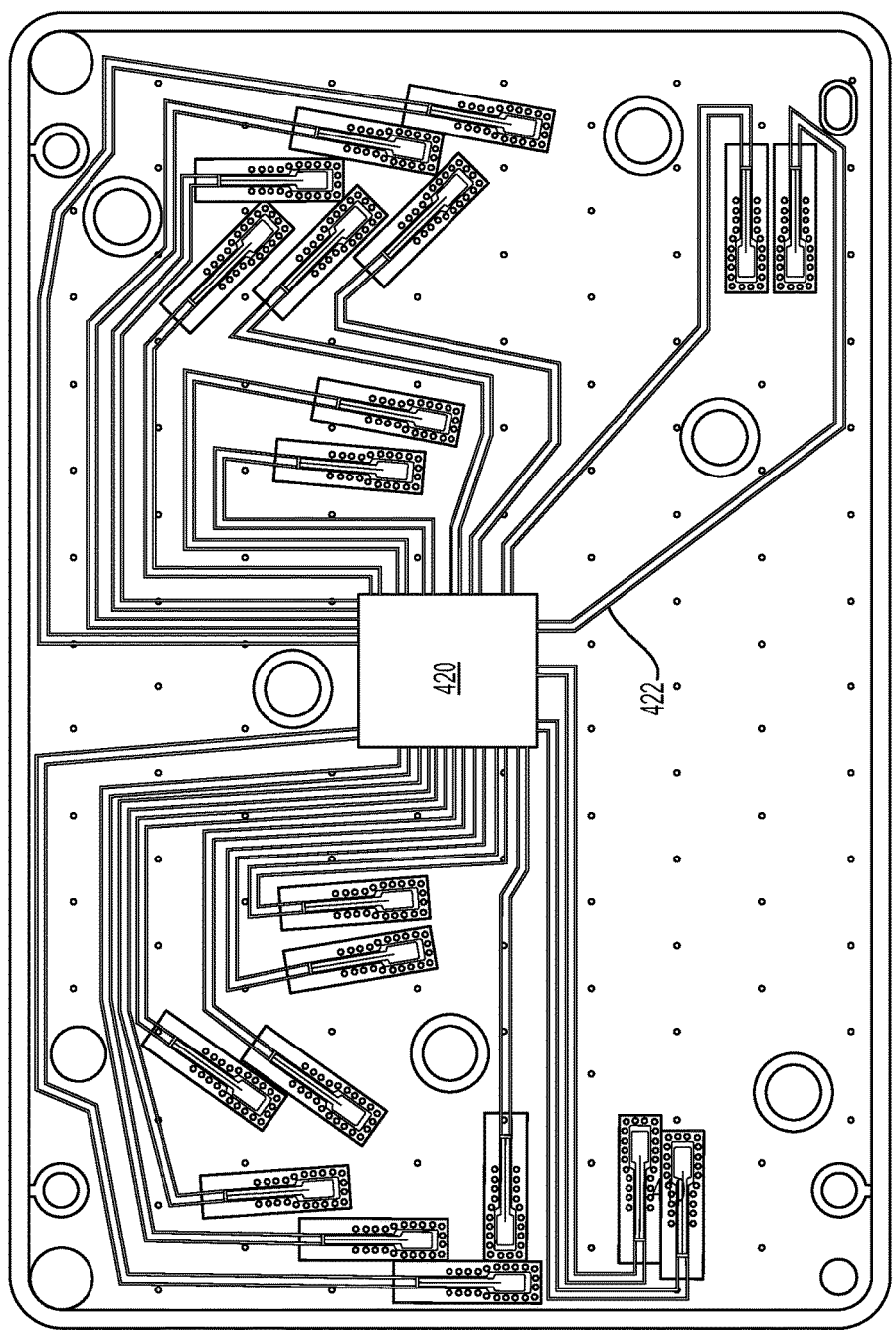
FIG. 4D illustrates an example arrangement of waveguide terminations and loads on a circuit board, in accordance with an example embodiment.

FIG. 4D illustrates an example arrangement of waveguide terminations and a load on a circuit board, in accordance with an example embodiment. FIG. 4D is similar to FIG. 4C, with the inclusion of a single attenuating component 420 that receives the reflected electromagnetic energy from each waveguide. The single attenuating component 420 may be a centralized common load, energy sink, or other energy-dissipation component or load. Each patch associated with an attenuating port may be configured to route reflected electromagnetic energy to a single attenuating component 420. The single attenuating component 420 may dissipate the reflected electromagnetic energy coupled by all the attenuation ports.

In yet further examples, there may be more than one attenuating component on the PCB, but less than one attenuating component per patch. In these examples, multiple patches may feed one attenuating component.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A radar system comprising:
   a plurality of radiating waveguides each having a waveguide input, wherein the radiating waveguides are aligned on a plane defined by a center of a width of the radiating waveguide and a length of the radiating waveguide, and wherein each radiating waveguide comprises at least one radiating element;
   at least one attenuation component, wherein the at least one attenuation component is disposed on a circuit board and wherein the attenuation component is configured to dissipate electromagnetic energy; and
   a beamforming network, wherein the beamforming network is aligned on the plane defined by the center of the width of the radiating waveguide and the length of the radiating waveguide, and wherein the beamforming network comprises:
      a beamforming network input,
      a plurality of beamforming network outputs, wherein each beamforming network output is coupled to one of the waveguide inputs, and
      at least one attenuation port, wherein the at least one attenuation port is configured to couple the beamforming network to the at least one attenuation component.

2. The radar system according to claim 1, wherein the at least one attenuation port comprises a plurality of attenuation ports and wherein the at least one attenuation component comprises a plurality of attenuation components, wherein each attenuation port is coupled to a respective attenuation component.

3. The radar system according to claim 1, wherein the attenuation component comprises a patch on the circuit board.

4. The radar system according to claim 3, wherein the patch comprises a surface configured to absorb electromagnetic energy.

5. The radar system according to claim 1, wherein the attenuation port is perpendicular to the plane of the waveguides.

6. The radar system according to claim 1, wherein the attenuation component comprises at least one microstrip line on the circuit board.

7. The radar system according to claim 1, wherein the attenuation component comprises conductive ink printed on the circuit board.

8. A method comprising:
  receiving electromagnetic energy by a waveguide, wherein the waveguide is aligned on a plane defined by a center of a width of the waveguide and a length of the waveguide;
  radiating at least a portion of the electromagnetic energy by radiating components of the waveguide, wherein a portion of the electromagnetic energy that is not radiated is reflected as reflected electromagnetic energy;
  coupling at least a portion of the reflected electromagnetic energy to an attenuation port, wherein the attenuation port is aligned perpendicular to the plane;
  coupling at least a portion of the reflected electromagnetic energy to an attenuation component, wherein the attenuation component is disposed on a circuit board; and
  dissipating the portion of the reflected electromagnetic energy coupled to the attenuation component by the attenuation component.

9. The method according to claim 8, wherein the waveguide comprises a plurality of attenuation ports, wherein each attenuation port is coupled to a respective attenuation component in a plurality of attenuation components.

10. The method according to claim 8, wherein the attenuation component comprises a patch on the circuit board, wherein the method further comprises coupling the portion of the reflected electromagnetic energy by the patch.

11. The method according to claim 8, further comprising absorbing the portion of the reflected electromagnetic energy by a surface of the patch.

12. The method according to claim 8, wherein the attenuation component comprises at least one microstrip line on the circuit board.

13. The method according to claim 8, wherein the attenuation component comprises conductive ink printed on the circuit board.

14. A waveguide system comprising:
  a waveguide feed configured to receive electromagnetic energy;
  a beamforming network coupled to the waveguide feed, wherein the beamforming network:
    is aligned on a plane defined by a center of a width of the beamforming network and a length of the beamforming network,
    has a plurality of elongated segments, and
    is configured to divide the electromagnetic energy into a plurality of portions of electromagnetic energy; and
  a plurality of radiating waveguides located in the plane, wherein each radiating waveguide comprises at least one radiating element, wherein each radiating waveguide receives one of the portions of electromagnetic energy and wherein the radiating element is configured to:
    radiate at least a portion of the received portion of electromagnetic energy, and
    reflect the portion of the received portion of electromagnetic energy that is not radiated;
  a respective attenuation port coupled to each of the elongated segments and configured to couple the reflected portion of the received portion of electromagnetic energy; and
  a respective attenuation component coupled to each attenuation port and configured to attenuate the reflected portion of the received portion of electromagnetic energy, wherein the attenuation component is disposed on a circuit board.

15. The waveguide system according to claim 14, wherein the beamforming network is configured to divide the electromagnetic energy based on a taper profile.

16. The waveguide system according to claim 14, wherein the attenuation component comprises a patch on the circuit board.

17. The waveguide system according to claim 16, wherein the patch comprises a surface configured to absorb electromagnetic energy.

18. The waveguide system according to claim 14, wherein the attenuation port is perpendicular to the plane of the waveguides.

19. The waveguide system according to claim 14, wherein the attenuation component comprises at least one microstrip line on the circuit board.

20. The waveguide system according to claim 14, wherein the attenuation component comprises conductive ink printed on the circuit board.

* * * * *